Peter Kirkham.
Buttons.
Nº 6651.    Patented Aug. 14. 1849.
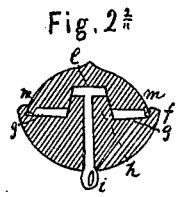
Fig. 2½.
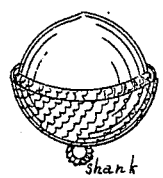
Fig. 1.
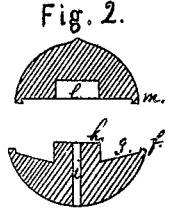
Fig. 2.
Fig. 3.
Fig. 4.
Fig. 5.
Fig. 6.
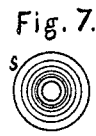
Fig. 7.
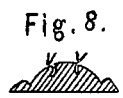
Fig. 8.
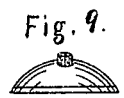
Fig. 9.
Fig. 10.
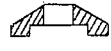
Fig. 11.
Fig. 12.
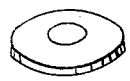
Fig. 13.
Fig. 14.
Fig. 15.

UNITED STATES PATENT OFFICE.

PETER KIRKHAM, OF BIRMINGHAM, ENGLAND, ASSIGNOR TO WM. R. HITCHCOCK & CO.

COVERED BUTTON.

Specification of Letters Patent No. 6,651, dated August 14, 1849.

*To all whom it may concern:*

Be it known that I, PETER KIRKHAM, of Birmingham, in the county of Warwick, (Warwickshire,) in England and Kingdom of Great Britain, have invented a new and useful Improvement in the Manufacturing of Buttons; and I hereby do declare that the following is a full, clear, and exact description.

The nature and principle of my invention and whereby it may be distinguished from all others, is described as follows, reference being had to the accompanying drawings making a part of this specification in which—

Figures 1, 4, 9, and 10 are perspective and Figs. 2, 2², 3, 5, 6, 7, 8, 11, and 12 are section view.

To distinguish my invention from other methods of making buttons, I will proceed to describe its construction, so as to enable others skilled in the art to make the same.

The common plan of making buttons to be covered with textile and other fabrics, is this. First, a collett or ring, is made like Fig. 13, all of metal, 2nd then a shell of this metal like Fig. 15. The shell is then covered with some textile material, filled up with paper wad like Fig. 14, and then by proper tools, the shell and collett are combined together, by the edge of the shell covering the flange rim of the collett and the two then pressed together—the flange of the collett being made to press outward and beveled by the action of the finishing tool in that direction, and the shell is pressed inward, so as the collett and shell may mesh, or be firmly united together forming one button.

My plan is this. Instead of employing a shell of metal filled with paper and uniting the same with a collett to form one button, I make the top of wood instead of using a metal shell, and I form it as shown in Fig. 2 and use a wooden bottom Fig. 3, for the old metal collett. The collett may be round or like the cup of an acorn, $f$, is a flange extending around at the outside, $g$ is a circular plane extending around also, $h$ is a projection or tenon, and $i$ is the shank hole—an opening through the middle of the bottom Fig. 3, to the outside.

$l$ is a mortise to receive $h$. $m$ is a small rim to fit inside of the flange $f$. To make a button of these two parts, a flexible cord, or piece of wire is inserted in the opening $i$, so as to form a loop (shank) on the outside. This loop or shank, is drawn by a proper tool through the fabric that covers the bottom part (if any fabric is used for that purpose). The outside of Fig. 2, is then covered with velvet, satin or other suitable fabric and the inner surfaces of the top, and bottom Figs. 2, and 3 are covered with glue. The two parts—top and bottom or molds, as they may be termed, are then pressed together with proper dies or tools, when the covering fabric, and the (elastic shank) will then be firmly secured inside, for the textile, or other fabric with which one or both parts may be covered, is allowed to overlap inside, and by the outer rim $m$ of the top being made to fit or catch into the inside of $f$, the covering is secured firmly inside by $h$, fitting snugly into $l$, and the fabric or covering is thus secured firmly between the rims or flanges in the mortise $l$ thereby forming a beautiful and unique button like Fig. 1.

The advantages of making buttons of two wooden molds as described, are these. No iron is used, which is a great saving (as the whole of the metal used for this purpose is imported). Buttons can thus be made of every variety of form, as tools are used to cut out, or form the several parts. The button which I term the acorn button, like Fig. 1, cannot, in any other manner be made so light, cheap and perfcet.

Buttons have been and are made—each of one wooden mold with a textile fabric drawn over it and secured at the bottom or shank part with needle and thread, but never before have two wooden molds—top and bottom covered with textile fabric (or the top only covered) been united together with the covering material and shank secured inside.

There are other modifications of my invention or button, and some little variations may be used to secure the two wooden molds—top and bottom together. This diversity is owing to the many different forms of buttons, such as that illustrated by Figs. 11, and 12, whereby the top may be covered with some textile fabric, and the bottom made of japanned, embossed or varnished wood and the two may be made either with a cloth shank like Fig. 4, or with a wire shank, and the two—top and bottom united like Figs. 2 and 3, when a button will be formed like a metal back button Fig. 10, only it will be far lighter than if made of metal and not so liable to wear through the cloth as a metal shell.

A button may be made with a wooden top and a metal bottom or collett, by having a flange $s$ on the collet Fig. 7, made to fit into the circular groove $v\ v$ of Fig. 8, forming a button like Fig. 9.

Fig. 5 is a metal collet, and Fig. 6 a top of wood.

C, Fig. 5 is a flange and $d$, is a counter-sink.

Fig. 6 has two grooves cut around on the inside, to receive the flanges $C^1$ and $C^2$ of the collet to unite the top and collet together to make one button resembling Fig. 4.

Having thus described my invention I claim—

The forming of the button with its two parts—top and bottom made of wood, joined together by appropriate fitting parts in the one to coincide with the other, to secure the textile covering inside and the shank likewise in the manner substantially as herein described, or in any other manner substantially the same.

PETER KIRKHAM.

In presence of—
 Rufus E. Hitchcock,
 C. B. Stewart.